United States Patent Office 3,078,300
Patented Feb. 19, 1963

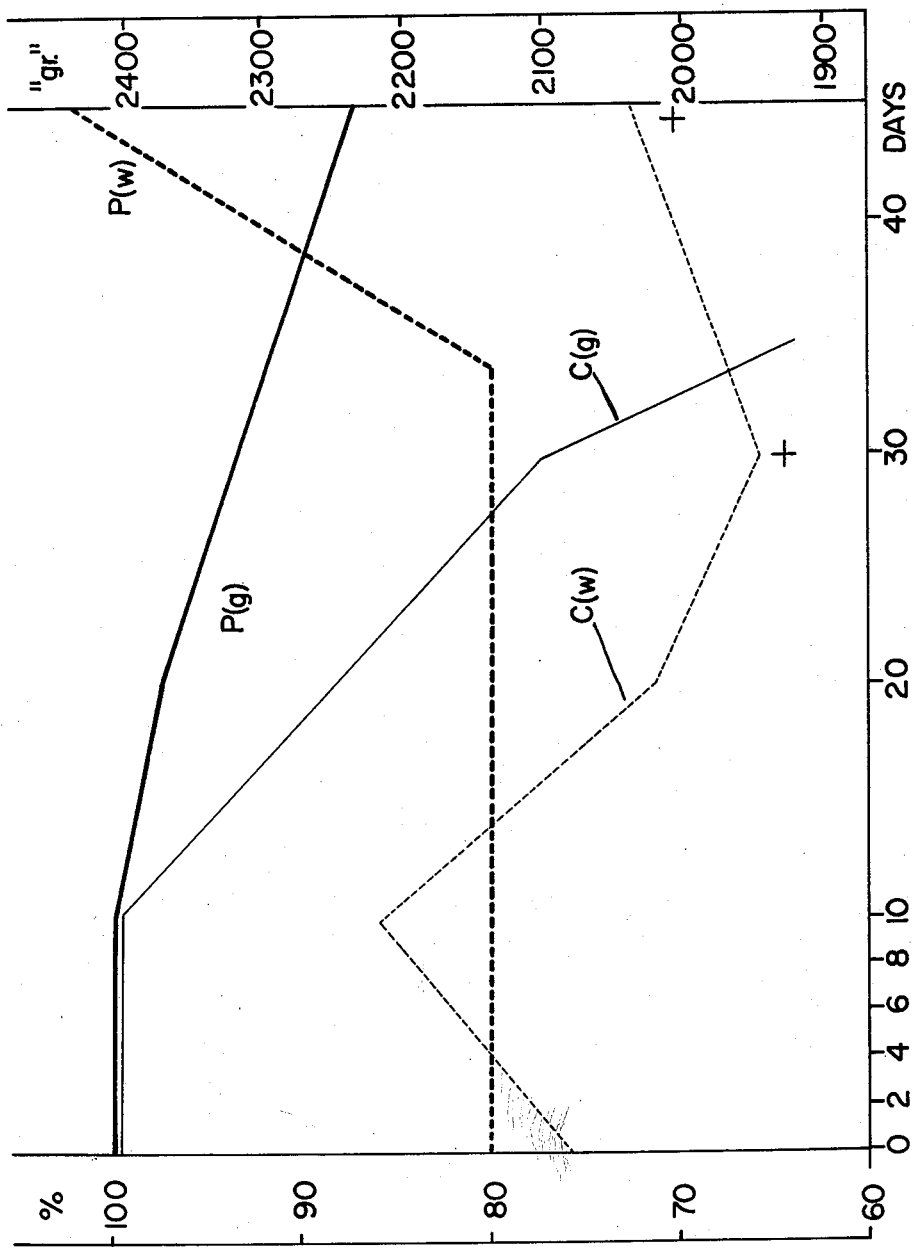

3,078,300
PROCESSES OF PRODUCTION OF NEW COMPOSITIONS AND DERIVATIVES OF CHLORAMPHENICOLS WITH REDUCED TOXICITY AND PRODUCTS THEREOF
Ivan Villax, Travessa do Ferreiro a Lapa 3,
Lisbon, Portugal
Filed Aug. 1, 1957, Ser. No. 675,711
Claims priority, application Portugal Aug. 2, 1956
7 Claims. (Cl. 260—482)

The invention relates to new and improved therapeutic compositions and compounds of chloramphenicol and to the manufacture of such compositions and compounds.

One object of this invention is to obtain new derivatives of chloramphenicol with reduced toxicity.

A further object of the invention is to obtain higher and more prolonged blood levels than those obtained by administering chloramphenicol alone.

The present invention consists essentially in preparing new compositions and compounds of chloramphenicol and of pantothenic acid or its salts.

Heretofore, the desintoxicating action of pantothenic acid was demonstrated exclusively towards basic Streptomyces antibiotics, containing a free amine group, as described by Keller et al. (Arzneimittel-Forschung, 5, 170, April 1955).

Furthermore, it has been found that pantothenic acid does not interfere with the antibacterial action of chloramphenicol, and the new compositions and compounds described in the present invention possess not only reduced toxicity but also other favorable pharmacological properties such as higher and more prolonged blood levels and a practically complete absence of secondary reactions in both animal tests and clinical trials.

Prior to the present invention, the application of chloramphenicol was restricted to special cases because of its high toxicity, especially the chronic one described by E. L. Loyd [Antibiotics & Chemotherapy, 2, 1 (1952)], although it is actually one of the most effective broad spectrum antibiotics.

The new derivatives, subject of the present invention are:

(a) New non-hygroscopic pharmaceutical compositions consisting of chloramphenicol and of a pantothenic salt;

(b) Pantothenate ester of chloramphenicol of the structural formula

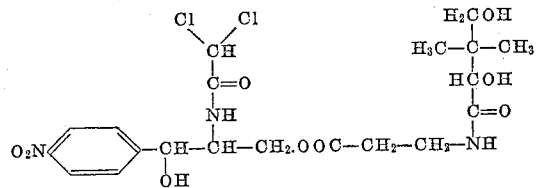

(c) A derivative represented by the following structural formula

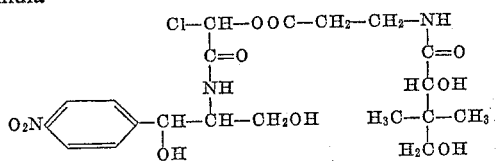

(d) Well defined complex compounds of chloramphenicol and a Ca or Na salt of pantothenic acid.

All of the above have been found to be safer and virtually more active pharmaceutical derivatives of chloramphenicol, permitting a wider and safer use of this valuable antibiotic.

By administering a simple physical admixture of a pantothenic acid salt and of a chloramphenicol in adequate proportions, one can observe a reduced toxicity, but, for different reasons, such as different velocities of absorption and elimination of both the compounds, the results are not quite satisfactory. However, if processes assuring a more perfect mixture are used, such as simultaneous precipitation of both the components from mutual solutions or covering the crystals of one of the components with a film of the second one, one obtains more satisfactory results, such as more prolonged blood levels than with the equivalent quantities of chloramphenicol alone and an absence of secondary reactions of the organism. To obtain such a film, one suspends one of the finely divided components (preferably the one that is more soluble in the gastric juice) in an organic solvent solution of the second component and, afterwards, one adds under stirring an organic solvent in which both the components are insoluble. That way the crystals of the suspended components will be covered by a film of the second one. In those processes one can use, instead of a salt of pantothenic acid, other derivatives of the same, such as pantothenamide, pantothenyl alcohol or an ester of the acid.

Another solution, still more satisfactory, is an esterification of chloramphenicols with pantothenic acid.

Considering the chloramphenicol formula (the numbering is made arbitrarily)

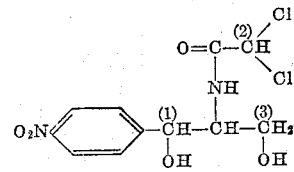

one has two hydroxyls both esterifiable theoretically. But the hydroxyl in position 3 only is susceptible to be easily esterified.

The esterification in position 3 of chloramphenicol by pantothenic acid may be performed using any of the usual methods of esterification, for instance, through the anhydride or mixed anhydride, ketene or acid halides of pantothenic acid, working at room temperature in an inert solvent. The time of reaction is usually from one half to three hours.

To obtain high yields, it is convenient to use a method, published by Wieland and Bokelman (Naturwissenschaften, p. 384, vol. 38, 1951), for the preparation of a mixed anhydride of pantothenic acid. Thus reacting pantothenate sodium with ethylchlorocarbonate in dimethylformamide yields the mixed anyhdride. Afterwards one adds to the reaction mixture, without preliminary isolation, the calculated quantity of chloramphenicol dissolved in dimethylformamide and stirs a few hours at room temperature. By distilling over in vacuo the dimethylformamide, one obtains a viscous oil which should be dissolved while still warm in an adequate organic solvent, for instance an aliphatic alcohol, such as isopropyl alcohol. The sodium chloride thus formed will be eliminated by filtration and one precipitates the ester by and addition of several volumes of ethyl ether to the clear solution. The product obtained may be purified when dissolved in hot isopropyl alcohol and precipitated once again by adding ethyl ether. This product is quite hygroscopic. So as to diminish this property, one lyophilizes its aqueous solution.

The same ester may be obtained using other active derivatives of pantothenic acid, such as acid halides, ketenes, anhydrides or by catalytic esterification, but it is convenient not to isolate these derivatives so as to avoid as far as possible secondary intramolecular reactions. So one proceeds as follows:

One adds to an equimolecular mixture of chloramphenicol and of a salt pantothenic acid the stoichiometric quantity (with a slight excess eventually) of thionylchloride, phosphorus-pentachloride, -trichloride or -tribromide, or else acetic anhydride in an inert solvent at a temperature inferior to 0° C. To complete the reaction, the reaction mixture may be refluxed afterwards.

To perform a catalytic etherification, one reacts one mole of acetyl chloride or of acetyl bromide with one mole of chloramphenicol and one mole of pantothenate salt, using an inert solvent and working at a temperature inferior to 0° C.

The reaction is complete after remaining two or three days at room temperature.

This ester has no full antibiotic activity "in vitro," but it hydrolyes easily in the human organism and causes high blood levels.

The attempts to esterify the hydroxyl in position 1 were unsuccessful. But the long refluxing of chloramphenicol and of metal salts of pantothenic acid in an inert solvent where both are soluble, at least when hot, and the metal chloride is insoluble, leads (by the elimination of a mole of metal chloride) to a new compound: 2-pantothenoyloxy-, 2-chloro - N - β-hydroxy-α-(hydroxymethyl), p-nitrophenethyl-acetamide. (In this nomenclature the numbering, being arbitrary, follows the numbering as indicated in the formula in column 2. This new compound contains a new asymmetric carbon atom, so the final product is a mixture of two stereoisomers, the separation of which, is the subject of another application. To perform this reaction, one uses preferably anhydrous dimethylformamide as solvent and one heats the reaction mixture to 75 to 100° C. Working at lower temperatures, the reaction is too slow; and at higher temperatures, the destruction of reagents is considerable. The reaction is practically complete if one works at 95° C. for 25 to 36 hours. Afterwards the dimethylformamide is distilled over in vacuo, yielding a viscous oil. By dissolving it in hot isopropyl alcohol, one separates the formed metal chloride by filtration and precipitates the final product by the addition of a mixture 1:1 of isopropyl and petrol ether. We shall call this product in the text that follows "ester 2." It has no activity "in vitro," but hydrolyzes easily in the human organism giving 2-chloro, 2-hydroxy-derivatives, which cause high blood levels.

During the preparation of "ester 2," we observed the formation of intermediary reaction products and were able to isolate them. We consider them according to their properties as complex compounds. Thus dissolving both components at 100° C. and distilling over immediately in vacuo the dimethylformamide, one obtains the complex compounds of chloramphenicol and a salt of pantothenic acid. We have isolated among others the complex compounds; one mole of sodium pantothenate and two moles of chloramphenicol; one mole of calcium pantothenate and two moles of chloramphenicol; and one mole of calcium pantothenate and four moles of chloramphenicol. This last one offers a particular interest, as it has very favorable pharmacological comportment.

These complex compounds have, besides their different pharmacological properties, solubilities, crystal shape and infra-red spectra different from those of the simple mixture of the two components. Comparing the infra-red spectra of the complex compound of chloramphenicol and of calcium pantothenate in the proportion 4:1 moles ("P") and of the mixture of one part of chloramphenicol and of 0.368 part of calcium pantothenate in mineral oil mull, one observes 3 essential differences:

(a) The mixture gives a shoulder at 5.95μ and a strong maximum at 6.05μ. "P" gives a strong maximum at 5.95μ and only a shoulder at 6.05μ.

(b) At 6.6μ, the mixture has no band, but both chloramphenicol and "P" have one.

(c) A large twinned band appears for the mixture from 9.6μ to 9.8μ and for "P" 9.4μ to 9.7μ.

The minimum quantity of pantothenic acid or derivatives that is necessary to obtain a significant desintoxicating effect, is about 6% of the weight of the administered chloramphenicol. If this value is superior to 25% in the compositions and derivatives, the $DL_{50}$ is 2 to 4 times greater than the $DL_{50}$ of the same quantity of chloramphenicol alone.

As is already known, the chloramphenicol has a relatively low acute-toxicity. The $DL_{50}$ is about 245 mg./kg. i.v.; at the same time, the $DL_{50}$ of chlorotetracyclin is about 140–170 mg./kg. But after a prolonged administration, the toxic action of chloramphenicol appears in a cumulative manner. Therefore, these new compositions and derivatives were tested especially for their chronic toxicity.

A prolonged administration of chloramphenicol may provoke blood dyscrasias, such as aplastic anemia, sometimes with a fatal issue.

For chronic toxicity tests, we used rabbits, divided into groups of 4. The rabbits of one group were administered daily, except for Sundays, intramuscularly, with 200 mg./kg. of chloramphenicol, and the rabbits of the other groups with the different derivatives related above in a quantity equivalent to 200 mg./kg. of chloramphenicol-base, for 45 days. Weights and blood counts were controlled before and during the administration.

As to weight, at the start of the treatment, a slight increase was noticed, but this was short-lived, as, after twenty days of administration the rabbits had lost it. In the meantime, starting from the 20th day, the weight of the rabbits treated with chloramphenicol began to diminish slightly, and at the end of the 34th day this loss of weight attained an average of 10%. The rabbits treated with pantothenates began to gain weight after the 30th day, and at the end of 45 days, this gain was up to 13%.

The blood counts during the first 30 days suffered the following variations:

Group treated with chloramphenicol—
  Haemoglobin: unchanged
  Red corpuscles: a certain decrease (in one case 30% in proportion to the original count)
  White corpuscles: slight increase
  Plaquettes: normal Group treated with pantothanates—
  Haemoglobin: slight increase
  Red corpuscles: slight decrease (between −18% and +6% in proportion to the initial count)
  White corpuscles: no change
  Plaquettes: normal At the end of 34 days, the first rabbit treated with chloramphenicol died, with all the characteristics of anemia (haemoglobin, 27%; red corpuscles, 1,900,000; white corpuscles, 6,050,000).

It must be noted that in the last 4 days, the red corpuscles count lowered from 4,000,000 to 1,900,000.

At the end of 45 days, the second rabbit, treated with chloramphenicol died with a relatively normal number of red corpuscles (3,310,000), and 50% haemoglobin, but the number of plaquettes decreased in 8 days from 347,000 to 40,000.

In the groups of rabbits treated with chloramphenicol pantothenate, there were no deaths during the 45 days of observation, nor did the blood counts vary very much as compared with the results obtained at the end of 30 days treatment.

Thus, the administration of 200 mg./kg. of chloramphenicol per day caused the death of two rabbits out of four in a period of 45 days, and in the two remaining, 10% loss of weight was verified.

The daily administration of chloramphenicol-pantothenates at a quantity equivalent to 200 mg./kg. of chloramphenicol-base caused no deaths, and the rabbits benefited by a weight increase of 13%.

The annexed draft represents the average changes in weight ($w$) in grams (right ordinate) and in red corpuscles ($g$) in percent, the initial counts taken as 100 (left ordinate) in respect of chloramphenicol (C) and in respect of pantothenates of chloramphenicol (P), during a period of 44 days of observation. The "+" represents death of rabbits.

The following examples are representative of the procedures embodied in the present invention but it is to be understood that these examples are given by way of illustration and not of limitation:

Example 1

One suspends 10 grams of sodium pantothenate in 75 ml. of methanol containing 25 grams of chloramphenicol at 0° C. To the well stirred suspension, one adds slowly 300 ml. of a mixture 1:3 of ethylenechloride and petrol ether. The mixture is cooled to 0° C. and three hours later it is filtered, washed and dried. One obtains thus a composition of chloramphenicol with a reduced toxicity, which causes, when administered, more prolonged blood levels. The product is not hygroscopic and may be used to prepare pills.

Example 2

One proceeds as in Example 1, but calcium pantothenate is used instead of sodium salt.

Example 3

One proceeds as in Example 1, but instead of sodium salt one uses 14 grams of pantothenic acid mono (p-nitrobenzoate).

Example 4

One adds dropwise 9.6 ml. of ethyl chloro carbonate to 24.1 grams of calcium pantothenate in 75 ml. of anhydrous dimethylformamide at a temperature of about 5° C. below 0°, under good stirring (as given by the Wieland and Bokelman's method).

After 30 minutes one adds, to the mixed anhydride thus obtained, 20 grams of chloramphenicol dissolved in 45 ml. of anhydrous dimethylformamide. When stirred for one hour at room temperature the dimethylformamide will be distilled over in vacuo. The residual oil is dissolved in the minimum quantity of hot isopropyl alcohol. This solution will be filtered when cold to eliminate the formed sodium chloride. Adding several volumes of ethyl ether to the clear filtrate, the ester precipitates. During its filtration, one avoids as far as possible all humidity considering the high hygroscopicity of the product. To obtain a less hygroscopic one, one lyophilizes its aqueous solution. The ester has no well defined melting point. It begins to sinter at 93° C.

Example 5

One adds dropwise 12 grams of a thionyl chloride in 80 ml. of anhydrous benzol, to a mixture of 32.3 grams of chloramphenicol and of 24 grams of sodium pantothenate in 160 ml. of anhydrous benzol at a temperature below 0° C. under good stirring. Afterwards the reaction mixture will be refluxed until no more $SO_2$ is formed. The solvent will then be distilled over and a further isolation and purification will be made as in Example 4.

Example 6

One adds dropwise 46 grams of phosphorous trichloride dissolved in 80 ml. of absolute chloroform to a mixture of 32.3 grams of chloramphenicol and 24 grams of sodium pantothenate in 160 ml. of absolute chloroform at a temperature below 0° C. under good stirring. When all of the reagent is added, one lets the reaction mixture warm up at room temperature, and stirs continuously for a further 12 hours. Afterwards the solvent will be evaporated in vacuo. The isolation and purification of the final product are made as in Example 4.

Example 7

One adds dropwise actyl chloride dissolved in 100 ml. of absolute dioxane to a mixture of 32.3 grams of chloramphenicol and of 24 grams of calcium pantothenate in 400 ml. of absolute dioxane at a temperature below 0° C. under good stirring. When all of the reagent is added, one continues stirring at room temperature for a further 12 hours, adding, afterwards, at least 10 ml. of absolute and redistilled pyridine. 12 hours later the solvent will be distilled over in vacuo. The isolation and purification of the final product may be performed as in Example 4.

Example 8

One proceeds as in Example 7 but using 10.2 grams of acetic anhydrid instead of acetyl chlorid.

Example 9

One reacts 24 grams of sodium pantothenate with 32.3 grams of chloramphenicol in 250 ml. of anhydrous dimethylformamid at 100° C. for 36 hours. Afterwards one distils over the solvent in vacuo. Dissolving the oil thus obtained in hot isopropyl alcohol, the formed sodium chloride will be eliminated by filtration. The addition of several volumes of a mixture 2:1 of ethyl ether and of petrol ether yields the "ester 2."

Example 10

One proceeds as in Example 9 but instead of sodium pantothenate one uses 8.2 grams of sodium acetate. The product obtained is the 2-chloro 2'-acetyl derivatives.

Example 11

One adds 71.1 grams of calcium pantothenate to a solution of 194 grams of chloramphenicol in 1,250 ml. of dimethylformamide at 100° C. One stirs until all of the whole calcium pantothenate is dissolved. Then one cools it to 50° C. and the solvent will be distilled over in vacuo at at least 1 mm. To the residual oil one adds 600 grams of 1,2-dichlorethane and stirs. The pantophenicol begins to crystallize. Afterwards one adds 950 ml. of petrol ether (boiling range 58°–68° C.). The product is filtered in vacuo, washed with petrol ether and dried. The melting point is of 143°–148° C.

Example 12

One proceeds as in Example 11 but, after dissolving the whole calcium pantothenate, one maintains the reaction mixture at 100° C. for 3 hours. The final product has a melting point of 158–163° C.

Example 13

One proceeds as in Example 11 but, instead of calcium pantothenate, one uses 144 grams of sodium pantothenate. The melting point of the final product is 142–148° C.

Example 14

One proceeds as in Example 13 but, instead of 144 grams, one uses 72 grams of sodium pantothenate (molar proportion 2:1).

I claim:
1. The product having the formula

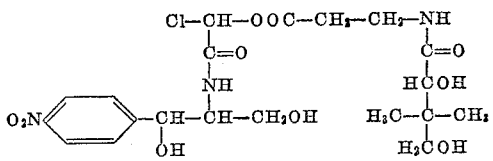

2. The complex compound of one mole of chloramphenicol and one mole of sodium pantothenate.
3. The complex compound of two moles of chloramphenicol and one mole of sodium pantothenate.

4. The complex compound of two moles of chloramphenicol and one mole of calcium pantothenate.

5. The complex compound of four moles of chloramphenicol and of one mole of calcium pantothenate.

6. A process for preparing the compound of claim 1 which comprises reacting substantially in the range 75° C. to 100° C., chloramphenicol and a metal salt of pantothenic acid, said metal salt being a member selected from the group consisting of alkali metal salt and alkaline earth metal salt, in dimethylformamide for a period from 3 to 36 hours.

7. A process for crystallizing amorphous complex compound prepared by the interaction, by a few minutes heating, of equivalent quantities of chloramphenicol and a member selected from the group consisting of sodium pantothenate and calcium pantothenate in dimethylformamide, which process comprises stirring said compound in a mixture of one part of ethylene chloride and two parts of petrol ether (boiling range 33° to 80° C.) at a temperature below 0° C.

References Cited in the file of this patent

UNITED STATES PATENTS

| | | |
|---|---|---|
| 2,662,906 | Edgerton | Mar. 3, 1951 |
| 2,791,595 | Edgerton | Jan. 14, 1953 |
| 2,838,552 | Gansau et al. | June 10, 1958 |
| 2,852,430 | Goebel | Sept. 16, 1958 |
| 2,891,943 | Keller et al. | June 23, 1959 |

OTHER REFERENCES

Keller et al.: Arzneimittel-Forschung, 5: 4, pages 170–176, April 1955.

Merck Index, sixth edition, Merck & Co., Inc., 1952, page 189, entry "Calcium Pantothenate," page 717, entry "Pantothenic Acid."

Bull. Johns Hopkins Hosp., vol. 85, No. 3, September 1949, pp. 221–230.

Sollman; "A Manual of Pharmacology," 8th ed., 1957, W. B. Saunders Company, page 117, middle of first column.